US007154253B1

(12) United States Patent
Gunther

(10) Patent No.: US 7,154,253 B1
(45) Date of Patent: Dec. 26, 2006

(54) DIGITALLY CONTROLLED MODULAR POWER SUPPLY FOR AUTOMATED TEST EQUIPMENT

(75) Inventor: Andre Gunther, San Jose, CA (US)

(73) Assignee: Inovys Corporation, Pleasanton, CA (US)

( * ) Notice: Subject to any disclaimer, the term of this patent is extended or adjusted under 35 U.S.C. 154(b) by 0 days.

(21) Appl. No.: 11/087,157

(22) Filed: Mar. 22, 2005

Related U.S. Application Data

(62) Division of application No. 10/613,848, filed on Jul. 3, 2003, now Pat. No. 6,900,621.

(51) Int. Cl.
*G05F 1/573* (2006.01)
*G05F 1/40* (2006.01)
*G05F 1/44* (2006.01)
*G05F 1/56* (2006.01)
*G05F 1/618* (2006.01)
*H02J 3/00* (2006.01)
*H02M 5/40* (2006.01)

(52) U.S. Cl. ...................... 323/283; 323/266; 323/280; 323/205; 323/207; 700/297; 700/298; 700/22; 318/432; 318/438; 318/550; 363/34

(58) Field of Classification Search ............ 700/17–20, 700/22, 83–89, 286, 293, 294, 295, 297, 700/298; 318/254, 432, 438, 550, 552; 323/207, 323/205, 208, 212, 266, 283, 280; 363/34, 363/37
See application file for complete search history.

(56) References Cited

U.S. PATENT DOCUMENTS 4,888,702 A * 12/1989 Gerken et al. .............. 700/295
5,144,211 A * 9/1992 Daggett et al. ........ 318/568.11
5,737,211 A * 4/1998 Hirai et al. ................. 363/144
5,910,889 A * 6/1999 Larsen et al. ................. 363/40
6,497,974 B1 * 12/2002 Fuglevand ................... 429/22
6,889,126 B1 * 5/2005 Komiyama et al. ........... 701/22
6,963,187 B1 * 11/2005 Bebic et al. ................ 323/207
2005/0184689 A1 * 8/2005 Maslov et al. .............. 318/254

FOREIGN PATENT DOCUMENTS

EP 001316464 A2 * 6/2003

* cited by examiner

*Primary Examiner*—Ramesh Patel

(57) ABSTRACT

A digitally controlled hybrid power module is controlled by a programmable controller. The hybrid power module includes a digitally controlled switching supply with an output coupled to an input of a digitally controlled linear voltage regulator. Independent control of switching supply and the linear regulator is provided by the programmable controller, which may be a field programmable gate array (FPGA), microcontroller, or digital signal processor (DSP). The programmable controller may independently control one or more power modules. Each power module may also include enable switching and an associated current clamp for capacitive loads. An output voltage transient suppressor may also be used to control transients, such as those produced under fast switching conditions.

16 Claims, 9 Drawing Sheets

800

DIGITALLY CONTROLLED MODULAR POWER SUPPLY FOR AUTOMATED TEST EQUIPMENT

RELATED APPLICATIONS

This application is a divisional of and claims priority to U.S. Pat. Ser. No. 10/613,848 now U.S. Pat. No. 6,900,621, entitled "Digitally Controlled Modular Power Supply For Automated Test Equipment," by Gunther, filed on Jul. 3, 2003, which is incorporated herein by reference.

FIELD OF THE INVENTION

The present invention relates to automatic test equipment (ATE) systems used to test integrated circuits (ICs). More specifically, the invention is directed to device power supplies (DPS) for providing power to circuits under test.

BACKGROUND ART

Automated test equipment (ATE) for digital integrated circuits are required to provide a stimulus to the integrated circuit (IC) and to measure the resultant digital response from the IC. Depending upon the size and function of the IC being tested, the power required for testing common ICs may range from less than one watt to greater than 50 watts. In order to meet the wide range of current and voltages required by various ICs, it is desirable that a power supply be programmable.

Since a power supply must be capable of meeting the current requirements for large ICs, it is also desirable that a power supply provide a means for current limiting in order to protect the test equipment and the circuit being tested.

FIG. 1A shows a conventional crowbar current limit scheme. When the load current reaches a specified limit, the power supply is switched off, with the load voltage and current being forced to zero. The power supply usually requires a reset to restore operation. This is a straightforward and cost effective current limiting technique to implement.

FIG. 1B shows a constant current limiting scheme. The constant current scheme allows for continued operation of the device being tested at the set maximum current; however, the power supply may be required to sustain a large voltage drop across its pass device, resulting in a large power dissipation by the supply. The requirement for handling the thermal load increases the cost and size of the power supply.

FIG. 1C shows a foldback technique that is a tradeoff between the crowbar and straight current limiting solutions. Instead of shutting off the supply current or maintaining a fixed value, the supply current is reduced in response to a drop in the load voltage when the current limit is reached. Although operation can be maintained at a reduced current, foldback limiting can have difficulty recovering from a short circuit, with the output voltage being limited if the load current rises above $I_{fb}$.

FIG. 2A shows an example of a conventional current limiting circuit 200. The load current is sensed by an instrumentation amplifier 205 by measuring the voltage drop across $R_{sense}$. The output of the instrumentation amplifier 205 is fed back into an error amplifier 210 that senses the output voltage $V_{out}$ and compares it against a reference voltage $V_{ref}$. It is desirable that the voltage and current sense loops be fast in order to guarantee fast transient response.

FIG. 2B shows an implementation of a foldback current limiting scheme 220. A Darlington pair pass device 225 includes transistors $Q_1$ and $Q_2$. A sensing network 230 comprises resistors $R_3$, $R_4$, $R_5$, and PNP transistor $Q_3$. Limiting is provided when increasing load current eventually turns on $Q_3$, producing an increasing voltage drop across $R_6$ that gradually turns off the pass device 225. The scheme 220 is dependent upon the base-emitter voltage of $Q_3$, and thus is dependent upon the transistor fabrication variability. The current limit cannot be easily adjusted without circuit modification.

FIG. 3A shows an example of a low ripple power supply 300 that is generally used as a device power supply (DPS) in Automated Test Equipment (ATE) systems. In spite of the relatively low efficiency of linear voltage regulators, they are preferred for use as a low ripple regulator 305 due to the absence of switching noise. The dissipation in the regulator 305 is the product of the voltage difference ($V_{pwr}$–$V_{out}$) and the load current. A digital-to-analog converter (DAC) 310 may be used to set the output voltage.

FIG. 3B shows a DPS 340 similar to that of FIG. 3A with a high efficiency switching supply 345 used to provide a fixed $V_{pwr}$ for a low ripple regulator 305. This scheme provides a stable input voltage for the linear voltage regulator 305; however, for low $V_{set}$, efficiency is reduced by the increased voltage drop across the regulator 305. This problem is exacerbated when a low voltage part requires more current than its higher voltage counterpart, which is typically the case.

SUMMARY OF INVENTION

Accordingly, what is needed is an improved device power supply (DPS) that provides both efficiency and flexibility for powering integrated circuits over a wider range of current and voltage requirements. The circuit may be used in automatic test equipment (ATE) applications in one embodiment. The embodiments of the present invention provide such efficiency and flexibility by using a combination of firmware programmability and hardware. These and other aspects of the present invention not recited above will become clear within the descriptions of the present invention presented below.

In one embodiment of the present invention, a digitally controllable hybrid power module is disclosed. An output of a switching power supply (e.g., a buck converter) is coupled to the input of a linear voltage regulator. The switching supply and linear regulator are each coupled to a digital-to-analog converter (DAC) that allows the independent adjustment of their respective output voltages. The hybrid power module may also include switches for enabling/disabling functionality. Output voltage transient suppression and current limiting may also be used to control transients, such as those produced during startup or under fast switching conditions.

In another embodiment, one or more hybrid power modules are controlled by a programmable controller. The programmable controller may be a field programmable gate array (FPGA), microcontroller, or digital signal processor (DSP). The programmable controller may independently control one or more power modules and provide protection features in firmware.

DESCRIPTION OF THE PREFERRED EMBODIMENTS

Reference will now be made in detail to the embodiments of the invention, digitally controlled modular power supplies for Automatic Test Equipment (ATE), examples of which are illustrated in the accompanying drawings. While the invention will be described in conjunction with the preferred embodiments, it will be understood that they are not intended to limit the invention to these embodiments. The invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Figure 1A:
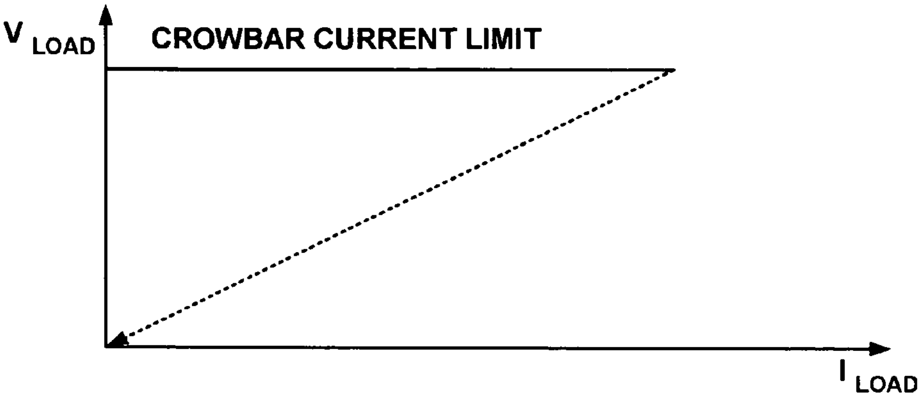
FIGURE 1A (PRIOR ART)
FIG. 1A shows a conventional crowbar current limiting scheme for a power supply.
Figure 1B:
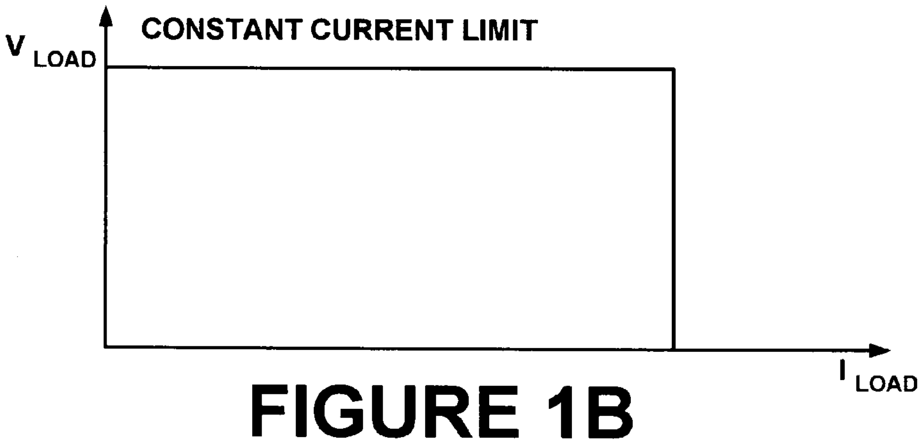
FIGURE 1B (PRIOR ART)
FIG. 1B shows a conventional constant current limiting scheme for a power supply.
Figure 1C:
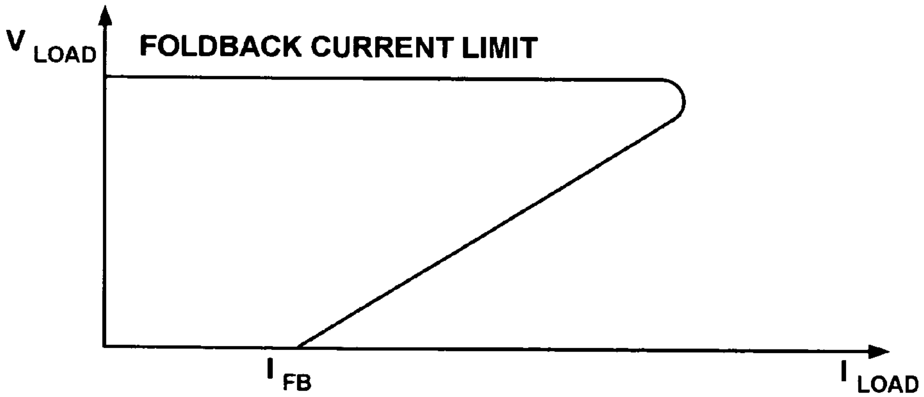
FIGURE 1C (PRIOR ART)
FIG. 1C shows a conventional foldback current limiting technique for a power supply.
Figure 2A:
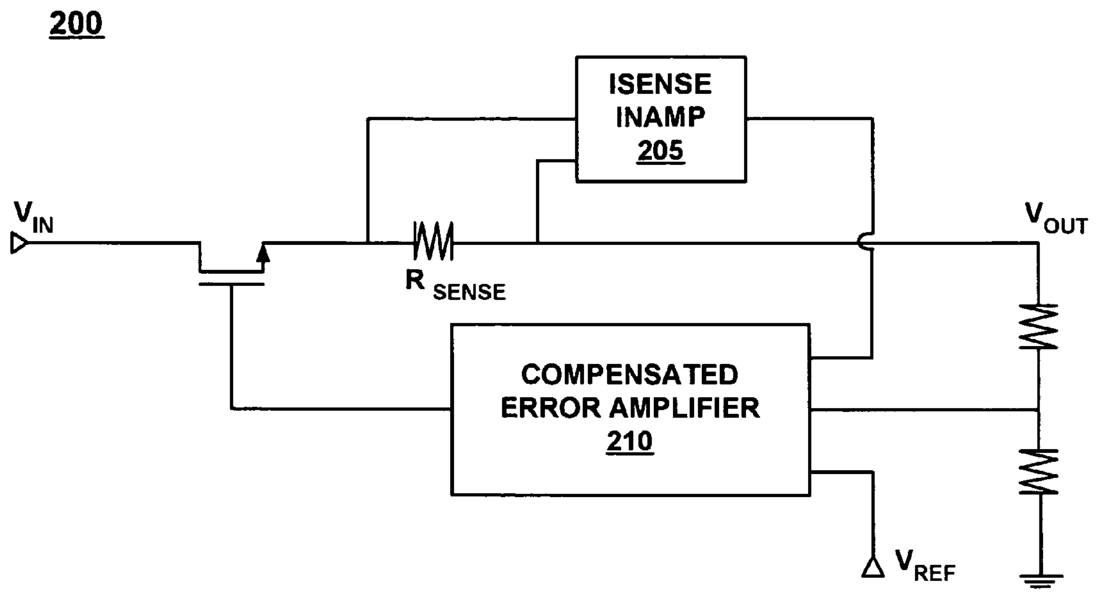
FIGURE 2A (PRIOR ART)
FIG. 2A shows an example of a conventional current limiting circuit.
Figure 2B:
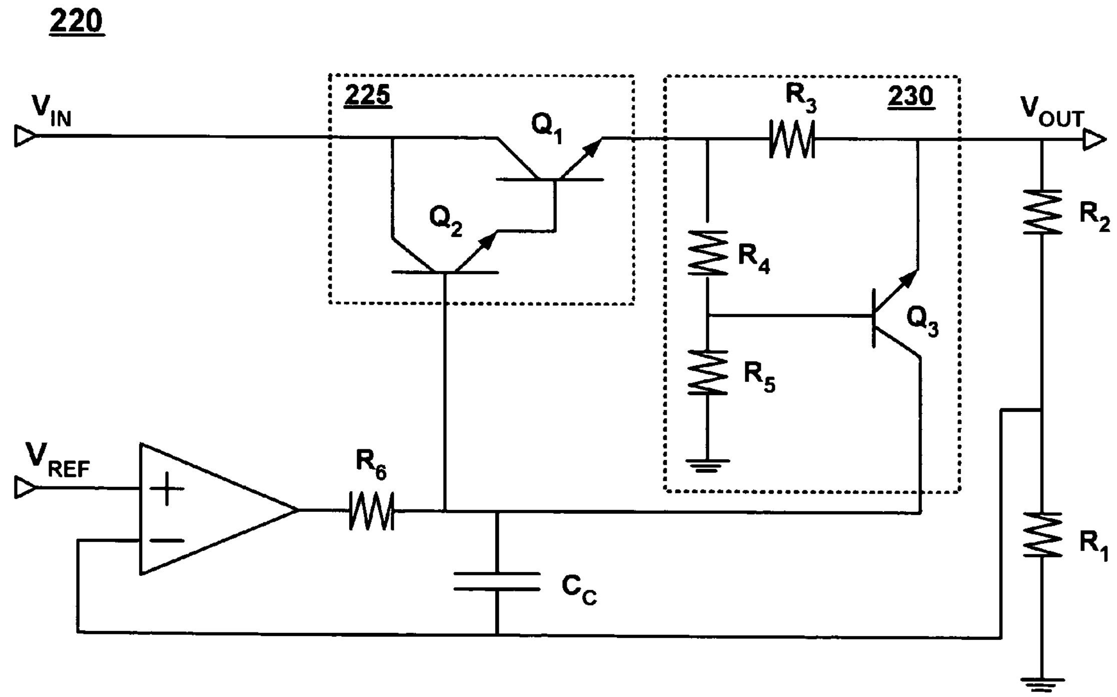
FIGURE 2B (PRIOR ART)
FIG. 2B shows an implementation of a conventional foldback current limiting circuit.
Figure 3A:
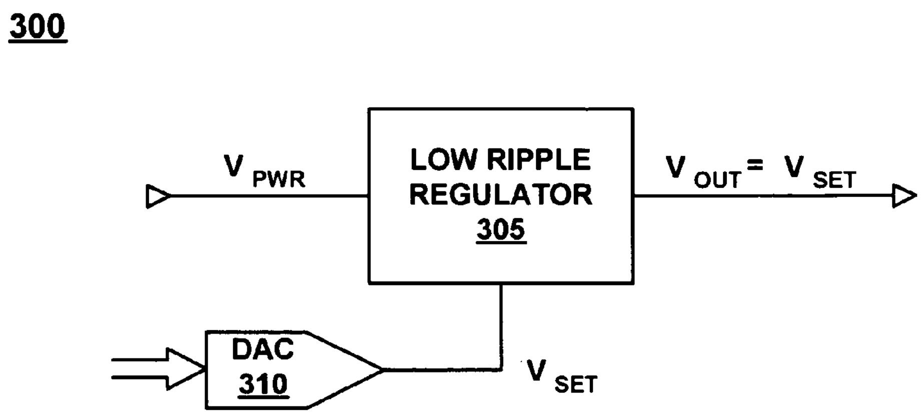
FIGURE 3A (PRIOR ART)
FIG. 3A shows an example of a low ripple power supply used as a device power supply (DPS) in Automated Test Equipment (ATE) systems.
Figure 3B:
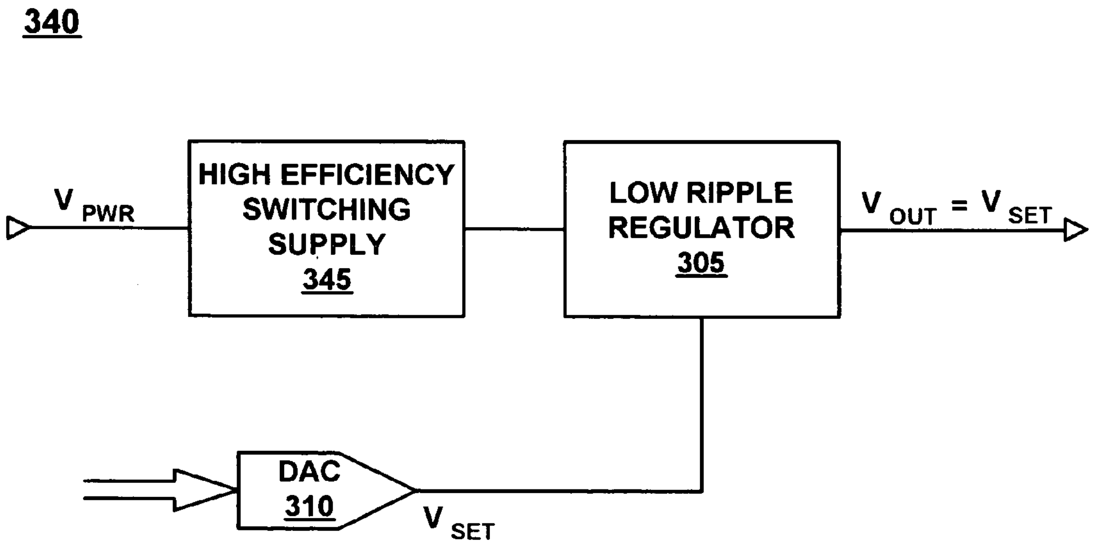
FIGURE 3B (PRIOR ART)
FIG. 3B shows a DPS 340 similar to that of FIG. 3A with in combination with a switching supply.
Figure 4:
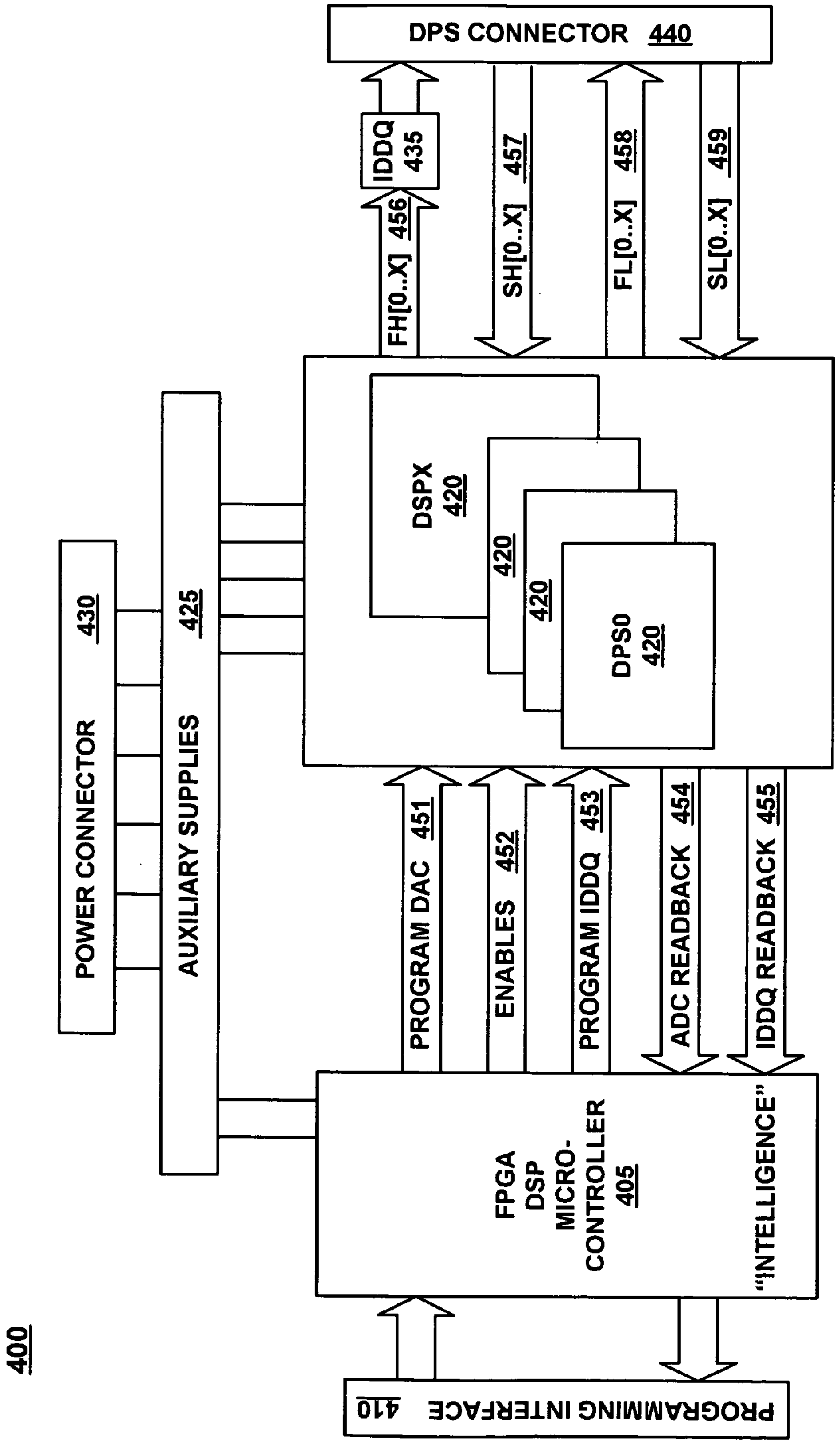
FIG. 4 shows a block level diagram for a digitally controlled hybrid power module in accordance with an embodiment of the present claimed invention.

FIG. 4 shows a diagram of a DPS 400 in accordance with an embodiment of the present invention. A programmable controller 405 is coupled to a programming interface 410 (e.g., JTAG), and is also coupled to a plurality of hybrid power modules 420 by digital data line types 451, 452, 453, 454, and 455. Auxiliary power supplies 425 provide the controller 405 and hybrid power modules 420 with power at one or more working voltages. The Auxiliary power supplies 425 are coupled to a power connector 430.

The controller 405 may be a microcontroller, digital signal processor (DSP), field programmable gate array (FPGA) or other device that is capable of executing a series of instructions. The programmable controller may include integrated memory for storing instructions and/or may also be coupled to an external memory.

Data line type 451 is used to provide digital data to one or more digital-to-analog converters (DACs) that may be incorporated in the modules 420. The digital data supplied to the DACs is used for control of the modules 420 through the setting of analog voltage levels for components within the module.

Data line type 452 is used for switch control within the modules 420. A high or low signal may be used for enabling and disabling particular functions through the opening and closing of switches.

Data line type 453 may be used for programming an auxiliary measurement system 435 (e.g. IDDQ) The measurement system 435 may be inserted in the power module output 456, and operated as a passthrough or test signal source for fault testing of a DUT.

Data line type 454 is used for receiving data from one or more analog-digital-converters (ADCs) incorporated in the modules 420. This data may include information regarding the voltage or current levels at circuit nodes within the power module, and/or the module outputs. The digital data received from the ADCs over lines 454 is used as feedback for controlling the power modules through the adjustment of the data sent over lines 451. Data line 455 may be used for receiving data from the IDDQ measurement system 435.

The power modules 420 are coupled to a DPS connector 440 that is part of an interface to a device under test (DUT). Each of the power modules has at least four connections. A force high FH 456 and force low FL 458 provide the supply current loop for the DUT, and a sense high SH 457 and sense low SL 459 provide for measurement of the voltage at the device under test (DUT).

Figure 5:
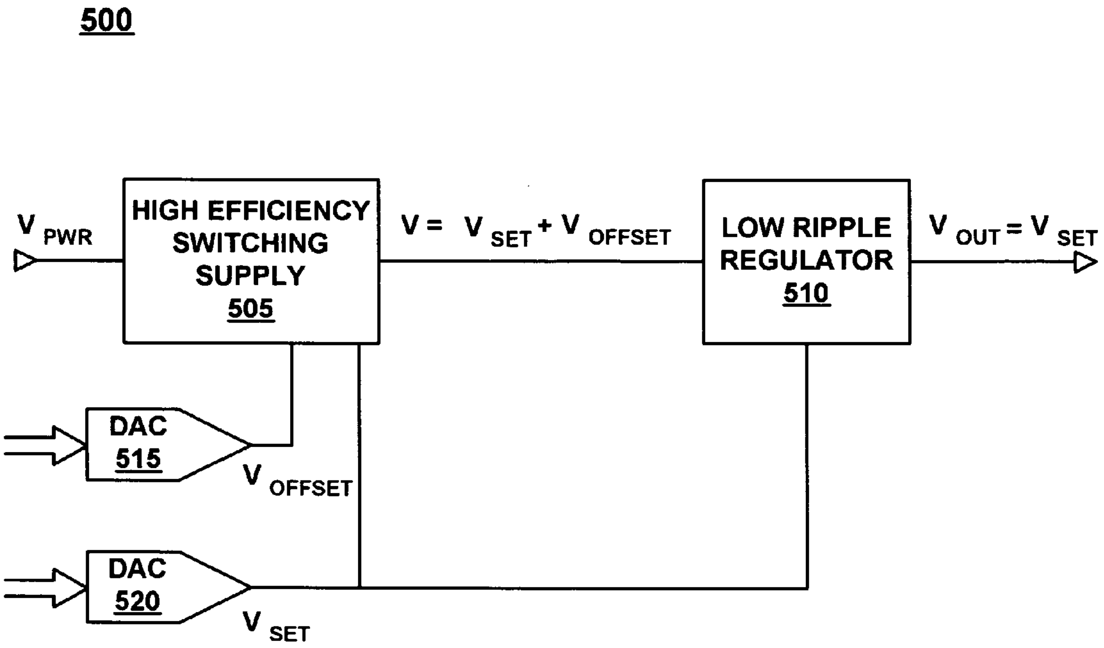
FIG. 5 shows a DPS in accordance with an embodiment of the present claimed invention.

FIG. 5 shows a block level diagram for a digitally controlled hybrid power module 500 in accordance with an embodiment of the present invention. The power supply 500 is referred to as a hybrid because it includes both a switching power supply 505 and a linear power supply 510. The output of the switching supply 505 is used to provide the input voltage V to the linear supply 510.

In contrast to the prior art, both the switching supply 505 and the linear supply 510 are digitally controlled. DAC 515 provides an analog output relating to $V_{offset}$, and DAC 520 provides an analog output relating to $V_{set}$. For example, $V_{set}$ could be equal to the desired output voltage for the linear supply. The analog signals for $V_{offset}$ and $V_{set}$ are derived from digital data provided to DAC 515 and DAC 520, respectively.

The output voltage V of the switching supply 505 is the sum of the programmed output voltage $V_{set}$ and an offset voltage $V_{offset}$. Thus, the switching supply 505 is coupled to both DAC 515 and DAC 520. The independent control of $V_{offset}$ with respect to the switching supply 505 allows the voltage drop across the linear supply to be set for an optimum balance between efficiency and ripple rejection. By setting $V_{offset}$ to the value required to meet a specified ripple rejection, unnecessary dissipation in the linear supply may be avoided. The linear supply 510 is coupled to DAC 520, and has a programmed output voltage $V_{out}=V_{set}$.

Figure 6:
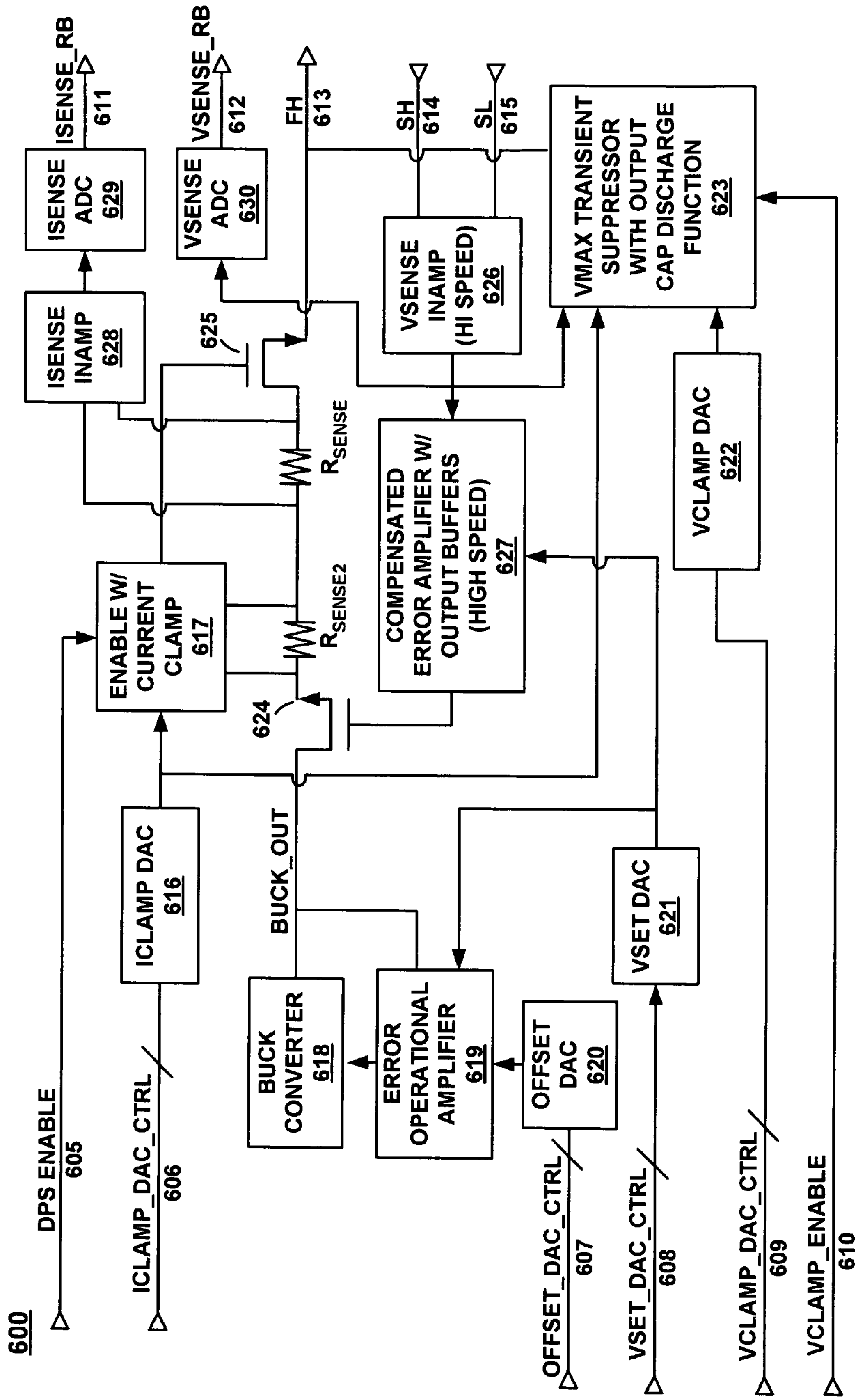
FIG. 6 shows a detailed diagram for a digitally controlled hybrid power module with dual current sensing resistors in accordance with an embodiment of the present claimed invention.

FIG. 6 shows a detailed diagram 600 for a digitally controlled hybrid power module that is an example of the module 420 of FIG. 4. Input lines 606, 607, 608, and 609 are examples of digital data line type 451. Input lines 605 and 610 are examples of digital data line type 452. Output lines 611 and 612 are examples of digital data line type 454.

Power supply outputs FH 613, SH 614, and SL 615 are shown. In this example, force low FL is not shown, and is taken as ground.

Power supply enable 605 is coupled to a current enable/clamp switch driver 617 that drives an output pass device (e.g., transistor) 625. The enable line 605 is used for turning the module on or off. The switch driver 617 is also coupled to a current clamp DAC 616 that is used to provide a signal to the switch driver 617 for limiting the output current to specific values. For example, transistor 625 may be a MOSFET.

For example, if a DUT presents a capacitive load, the current may be limited at startup in order to prevent damage. The current is sensed by the driver 617 by sensing the voltage across the current sense resistor $R_{sense2}$. This signal is compared to the reference analog signal from the current clamp DAC 616 by the driver 617.

Since $R_{sense2}$ is in the output current path, it desirable that the resistance value be kept below 100 milliohms, with a preferred value of about 50 milliohms. It is also desired that ratio of $R_{sense2}/R_{sense}$ be less than one, with a preferred value of about 0.5. In general, the availability of a pair of resistors comprising $R_{sense}$ and $R_{sense2}$ enables the flexibility of independently selecting values to attain desired accuracy, loop response (speed), and dissipation according to the specific implementation.

An error amplifier 619 is coupled to a switching power supply (e.g., buck converter) 618, $V_{set}$ DAC 621, $V_{offset}$ DAC 620, and also to the output of the buck converter 618. The error amplifier 619 combines feedback from the output of the buck converter 618 with the control signals from DAC 620 and DAC 621 to establish the input voltage for the linear supply stage made up of the pass device 624 (e.g., MOSFET), the compensated error amplifier 627 and the output voltage sensing device (626).

The error amplifier 627 is coupled to an instrumentation amplifier 626 that is in turn coupled to sense high SH 614 and sense low SL 615. The actual voltage supplied to the DUT by the module output is sensed by SH 614 and SL 615 and combined with the reference signal from the $V_{set}$ DAC 621 to provide the control signal for the pass device 624. Amplifier 626 is preferably a device with fast response so that voltage transients may be detected.

The instrumentation amplifier 626 is also coupled to a voltage sensing ADC 630 that has its output coupled to voltage sense read back 612 (digital data line type 454). The digital signal from the voltage sensing ADC 630 provides information to the programmable controller for supervising the startup, operation, and shutdown of the module 600. Information is also provided to the programmable controller by current sense ADC 629.

Current sense ADC 629 is coupled to a current sensing instrumentation amplifier 628 that senses the voltage drop across $R_{sense}$. In order to provide higher resolution, absolute values and relative proportions may be chosen for $R_{sense}$ and $R_{sense2}$ to implement desired accuracy, loop response (speed), and dissipation goals.

In a preferred embodiment, $R_{sense}$ is typically has a larger value than $R_{sense2}$; for example, if $R_{sense2}$ is equal to 50 milliohms, $R_{sense}$ would be set at about 100 milliohms. The digital signal from the current sensing ADC 629 provides information to the programmable controller for supervising the startup, operation, and shutdown of the module 600.

A transient voltage suppressor 623 is coupled to the power supply output FH 613, instrumentation amplifier 626, current clamp DAC 616, voltage clamp DAC 622, and voltage clamp enable 610. The transient suppressor 623 is able to sink current at the output FH 613 in response to the sensed voltage at SH 614 and SL 615. Enablement of the suppressor 623 is controlled by the enable line 610, and the operating parameters are controlled by current clamp DAC 616 and voltage clamp DAC 622.

Figure 7:
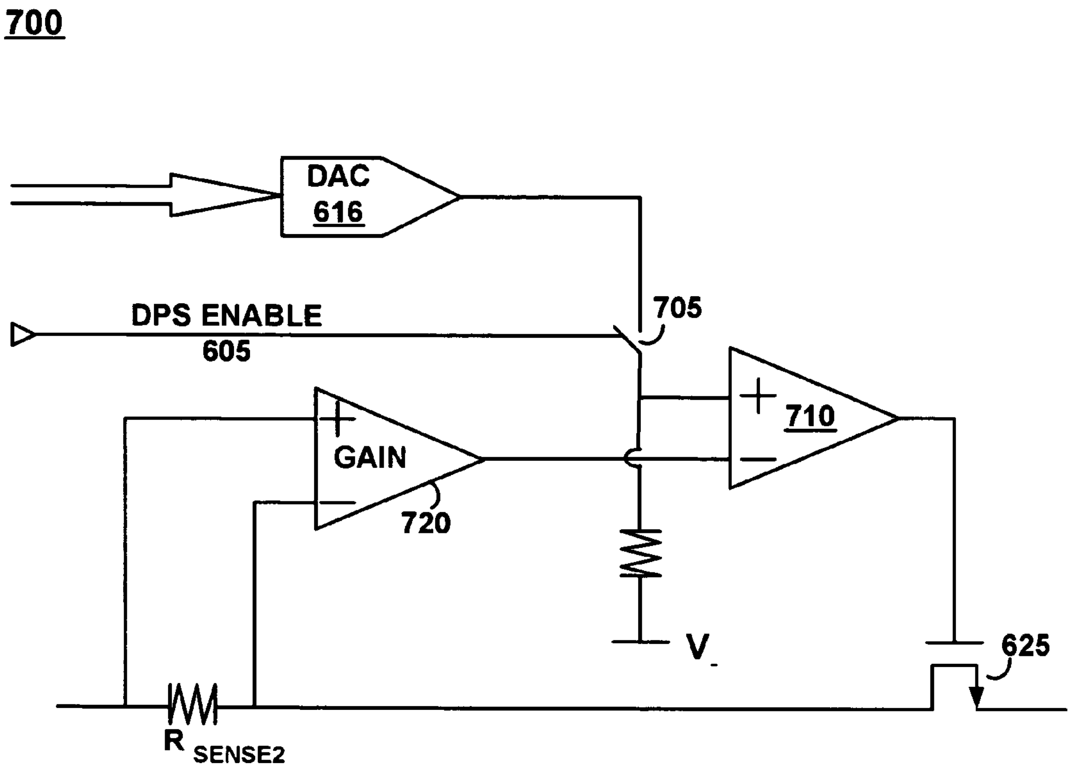
FIG. 7 shows a diagram for an inrush current limiting switch in accordance with an embodiment of the present claimed invention.

FIG. 7 shows a diagram 700 for an example of an enable/clamp switch comprising a driver 617 and a pass device 625. When the enable line 605 is off, switch 705 is open, and the voltage at the positive input of amplifier 710 is pulled negative, causing the pass device 625 to be closed. When line 605 is on and switch 705 is closed, The signal from DAC 616 produces a positive voltage at the positive input of amplifier 710.

As current flows through $R_{sense2}$, difference amplifier 720 produces an output signal proportional to the output current. As the signal from amplifier 720 approaches the level of the signal from DAC 616, amplifier 710 will begin to turn off the pass device 625, and limit the output current. The onset of limiting may be adjusted by adjusting the gain of amplifier 720.

Figure 8:
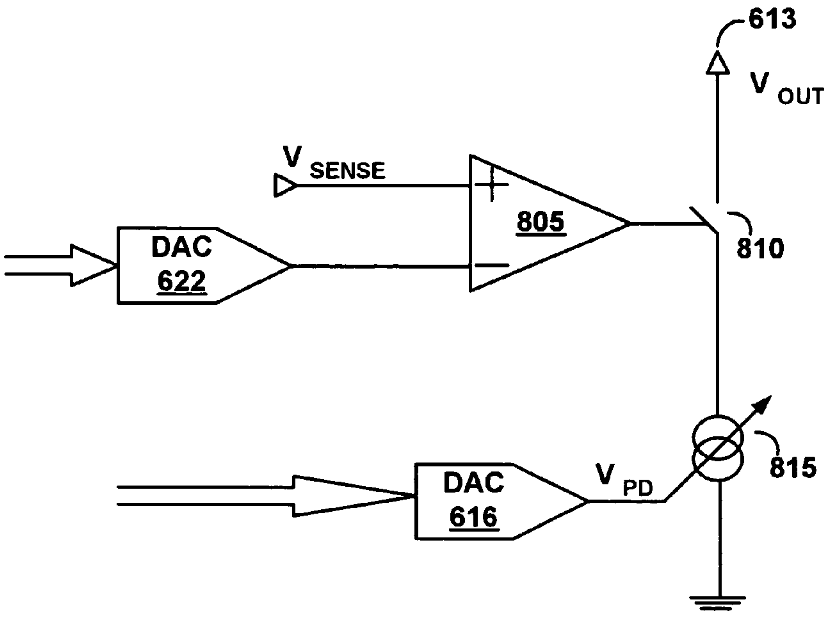
FIG. 8 shows a diagram for a transient suppressor and discharge unit in accordance with an embodiment of the present claimed invention.

FIG. 8 shows a diagram 800 for an example of a transient voltage suppressor 623. An error amplifier 805 has a positive input $V_{sense}$ coupled to the DUT (e.g., by instrumentation amplifier 626), and the negative input coupled to the voltage clamp DAC 622. A reference voltage from DAC 622 equal to the output voltage plus an additional $V_{delta}$ establishes the maximum voltage that is to be allowed at the module output (613).

When the output voltage at $V_{sense}$ exceeds the reference limit voltage of DAC 622, switch 810 is closed, allowing the programmable current sink 815 to discharge the capacitance at the output and reduce the output voltage. DAC 616 provides a current limit level $V_{pd}$ for the programmable sink 815.

Since a finite amount of capacitance and inductance exists at the output of the module when configured for testing a device, fast switching of large load currents will lead to voltage transients and stored charge. Negative transients are accommodated by the linear supply control loop, whereas positive spikes are handled by the transient voltage suppressor 623. Furthermore, circuits of the type described above can be used to provide a reverse current path, for fast discharging of the output capacitance. Thus a means for slewing the output voltage negative has been provided.

The combination of ADCs (629, 630) and DACs (616, 620, 621, and 622) shown in FIG. 6 allow the programmable controller 405 of FIG. 4 to implement a wide variety of current limiting and voltage limiting schemes.

At startup, inrush currents may be limited using the current clamp DAC 616. During operation, the combination of ADCs and DACs may be used to provide simple shutdown (crowbar), fixed current limit, or foldback limiting. Output voltage transients may also be suppressed.

Figure 9:
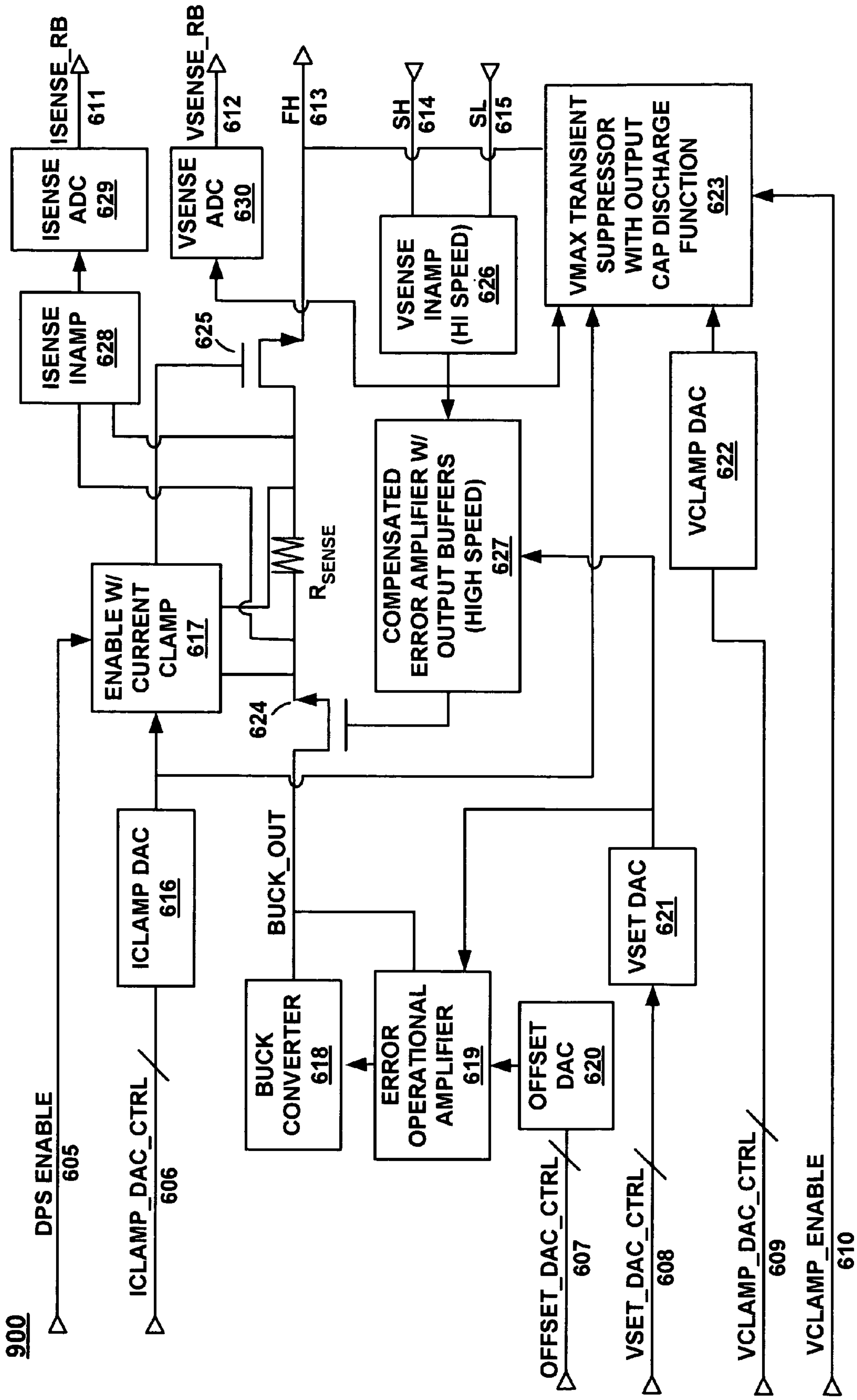
FIG. 9 shows a detailed diagram for a digitally controlled hybrid power module with a single sensing resistor in accordance with an embodiment of the present claimed invention.

FIG. 9 shows a detailed diagram 900 for a digitally controlled hybrid power module that uses a single current sense resistor $R_{sense}$ in place of the combination of $R_{sense}$ and $R_{sense2}$ shown in FIG. 6. The use of a single current sense resistor provides a simpler and more compact design, but the accuracy of the instrumentation amplifier 628 may be affected by the load of current enable/clamp switch driver 617.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A device power supply for an automated test equipment system comprising:
- a digitally controlled hybrid power module;
- a programmable controller coupled to said module; and
- a programming interface coupled to said programmable controller.

2. The device power supply of claim 1, wherein said programmable controller is coupled to said module by a digital data line used for enabling and disabling an output of said module.

3. The device power supply of claim 1, wherein said programmable controller is coupled to said module by a digital data line used for receiving data from an analog-to-digital converter associated with said module.

4. The device power supply of claim 1, wherein said programmable controller is coupled to said module by a digital data line used for programming an auxiliary measurement system.

5. The device power supply of claim 4, wherein said auxiliary measurement system is a quiescent drain current (IDDQ) measurement system.

6. The device power supply of claim 1, wherein said programmable controller is coupled to said module by a digital data line for transmitting digital data to a digital-to-analog converter associates with said module.

7. The device power supply of claim 1, further comprising auxiliary power supplies coupled to said programmable controller and to said module.

8. The device power supply of claim 1, further comprising a digital data line for receiving data from an auxiliary measurement system.

9. A device power supply for an automated test equipment system comprising:
- a digitally controlled hybrid power module means;
- a programmable controller means coupled to said module means; and
- a programming interface means coupled to said programmable controller means.

10. The device power supply of claim 9, wherein said programmable controller means is coupled to said module means by a digital data line used for enabling and disabling an output of said module means.

11. The device power supply of claim 9, wherein said programmable controller means is coupled to said module means by a digital data line used for receiving data from an analog-to-digital converter means associated with said module means.

12. The device power supply of claim 9, wherein said programmable controller means is coupled to said module means by a digital data line means used for programming an auxiliary measurement system means.

13. The device power supply of claim 12, wherein said auxiliary measurement system means is a quiescent drain current (IDDQ) measurement system means.

14. The device power supply of claim 9, wherein said programmable controller means is coupled to said module means by a digital data line means for transmitting digital data to a digital-to-analog converter means associates with said module means.

15. The device power supply of claim 9, further comprising auxiliary power supplies means coupled to said programmable controller means and to said module means.

16. The device power supply of claim 9, further comprising a digital data line means for receiving data from an auxiliary measurement system means.

* * * * *